(12) United States Patent
McAuliffe et al.

(10) Patent No.: US 7,394,175 B2
(45) Date of Patent: Jul. 1, 2008

(54) INTEGRAL MOTOR AND AIR BEARING COOLING PATH

(75) Inventors: Christopher McAuliffe, Windsor, CT (US); Craig Beers, Wethersfield, CT (US); Thomas Zywiak, Suffield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 119 days.

(21) Appl. No.: 11/231,541

(22) Filed: Sep. 21, 2005

(65) Prior Publication Data

US 2006/0061221 A1   Mar. 23, 2006

Related U.S. Application Data

(60) Provisional application No. 60/611,921, filed on Sep. 22, 2004.

(51) Int. Cl.
*H02K 9/00* (2006.01)
(52) U.S. Cl. .............................. 310/58; 310/59; 310/90; 417/423.12
(58) Field of Classification Search .................. 310/58, 310/59, 61, 90; 417/423.8
See application file for complete search history.

(56) References Cited

U.S. PATENT DOCUMENTS

| | | | | |
|---|---|---|---|---|
| 2,793,506 A * | 5/1957 | Moody | ......................... | 62/505 |
| 2,894,155 A * | 7/1959 | Labastie | ....................... | 310/54 |
| 5,113,670 A * | 5/1992 | McAuliffe et al. | ............ | 62/402 |
| 5,471,104 A * | 11/1995 | Toshimitsu et al. | ........... | 310/90 |
| 5,605,045 A * | 2/1997 | Halimi et al. | .................. | 60/607 |
| 6,368,082 B1 | 4/2002 | Armin et al. | | |
| 6,455,964 B1 * | 9/2002 | Nims | ......................... | 310/90 |
| 6,489,700 B1 * | 12/2002 | Heiberger et al. | ........... | 310/178 |
| 6,580,179 B2 * | 6/2003 | Eccles et al. | .................. | 290/44 |
| 6,657,332 B2 * | 12/2003 | Balas | ........................... | 310/58 |
| 6,720,685 B2 * | 4/2004 | Balas | ........................... | 310/42 |
| 2002/0110450 A1 * | 8/2002 | Swinton | ..................... | 415/143 |
| 2004/0141836 A1 * | 7/2004 | McAuliffe et al. | .......... | 415/145 |
| 2006/0061221 A1 * | 3/2006 | McAuliffe et al. | ............ | 310/59 |

FOREIGN PATENT DOCUMENTS

| | | |
|---|---|---|
| JP | 02084037 | 3/1990 |
| JP | 11303790 | 11/1999 |
| JP | 2003120214 | 4/2003 |

\* cited by examiner

*Primary Examiner*—Burton Mullins
(74) *Attorney, Agent, or Firm*—Carlson, Gaskey & Olds

(57) ABSTRACT

A motor is provided including a housing having single and integral motor and bearing cooling inlets. The motor is arranged within the housing and includes a stator and a rotor assembly supported on air bearings. The cooling inlet is in fluid communication with the motor stator and with the air bearings. The motor cooling inlet provides and the bearing cooling inlet provides a uniform pressure on the rotor assembly. The uniform pressures exerted on the rotor assembly produce bearing loads that generally cancel one another. The source of the cooling flow is uncompressed air at low pressure. This may be achieved by providing a vent in the housing that is common to both the motor cooling inlet and the bearing cooling inlet. As a result, journal bearings and seals of substantially the same size may be used.

15 Claims, 2 Drawing Sheets

INTEGRAL MOTOR AND AIR BEARING COOLING PATH

The present application claims priority to U.S. Provisional Application Ser. No. 60/611,921, filed Sep. 22, 2004.

BACKGROUND OF THE INVENTION

This invention relates to a motor cooling path and thrust bearing load design.

Conventionally, electric motors have a rotor assembly driven by a stator. Motors subject to high heat may use air bearings, particularly, journal and thrust bearings. The air bearings and stator of an electric motor have been cooled using two airflow paths that are separate from one another. That is, the airflow paths have separate inlets and separate outlets. As a result of using separate flow paths, the bearings are subject to different loads based upon the different pressures in the flow paths that are exerted on the rotor assembly, bearings, and seals. The imbalanced loading on the rotor assembly increases the load on the thrust bearing, which is undesirable.

It is desirable to balance the loads so that the net axial load on the thrust bearing is zero. Typically, the journal bearings used to support the rotor assembly are of an unequal size to compensate for the imbalance of loads resulting from the different pressures.

The separate flow paths are conventionally separated from one another using numerous, unequally-sized seals. The different bearings and seals add cost and complexity to the assembly of the motor.

What is needed is a single source for the bearing and motor cooling to minimize cost and complexity. What is needed also is a load design for the thrust bearings that minimizes cost and reduces complexity assembling the motor. It is desirable not to use high pressure (compressed) air.

SUMMARY OF THE INVENTION

The present invention provides a motor including a housing having a single integral motor and bearing cooling inlet. The motor is arranged within the housing and includes a stator and a rotor assembly supported on air bearings. A single integral cooling inlet is in fluid communication with the stator and in fluid communication with the air bearings. The cooling inlet provides both cooling fluid at a single pressure on the rotor assembly, and bearing cooling fluid on the rotor assembly. The source of this cooling flow is not compressed air, but low-pressure uncompressed air. The pressures exerted on the rotor assembly produce bearing loads that generally cancel one another. As a result, journal bearings of substantially the same size may be used.

Accordingly, the present invention is a load design for the thrust bearings that minimizes cost and reduces complexity assembling the motor.

These and other features of the present invention can be best understood from the following specification and drawings, the following of which is a brief description.

DETAILED DESCRIPTION OF THE PREFERRED EMBODIMENT

Figure 1:
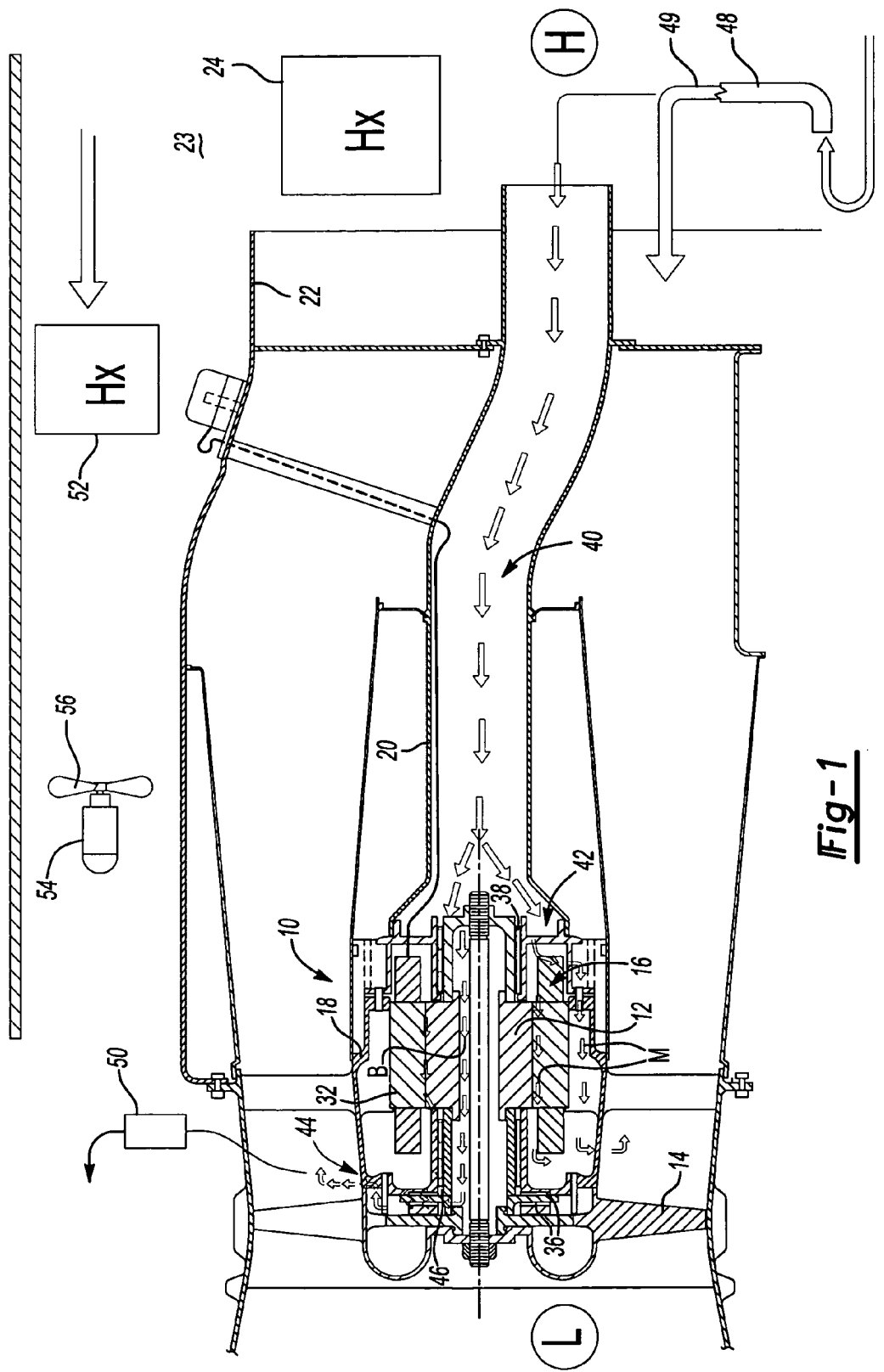
FIG. 1 is a cross-sectional view depicting an integral cooling flow to a motor stator and air bearing.
Figure 2:
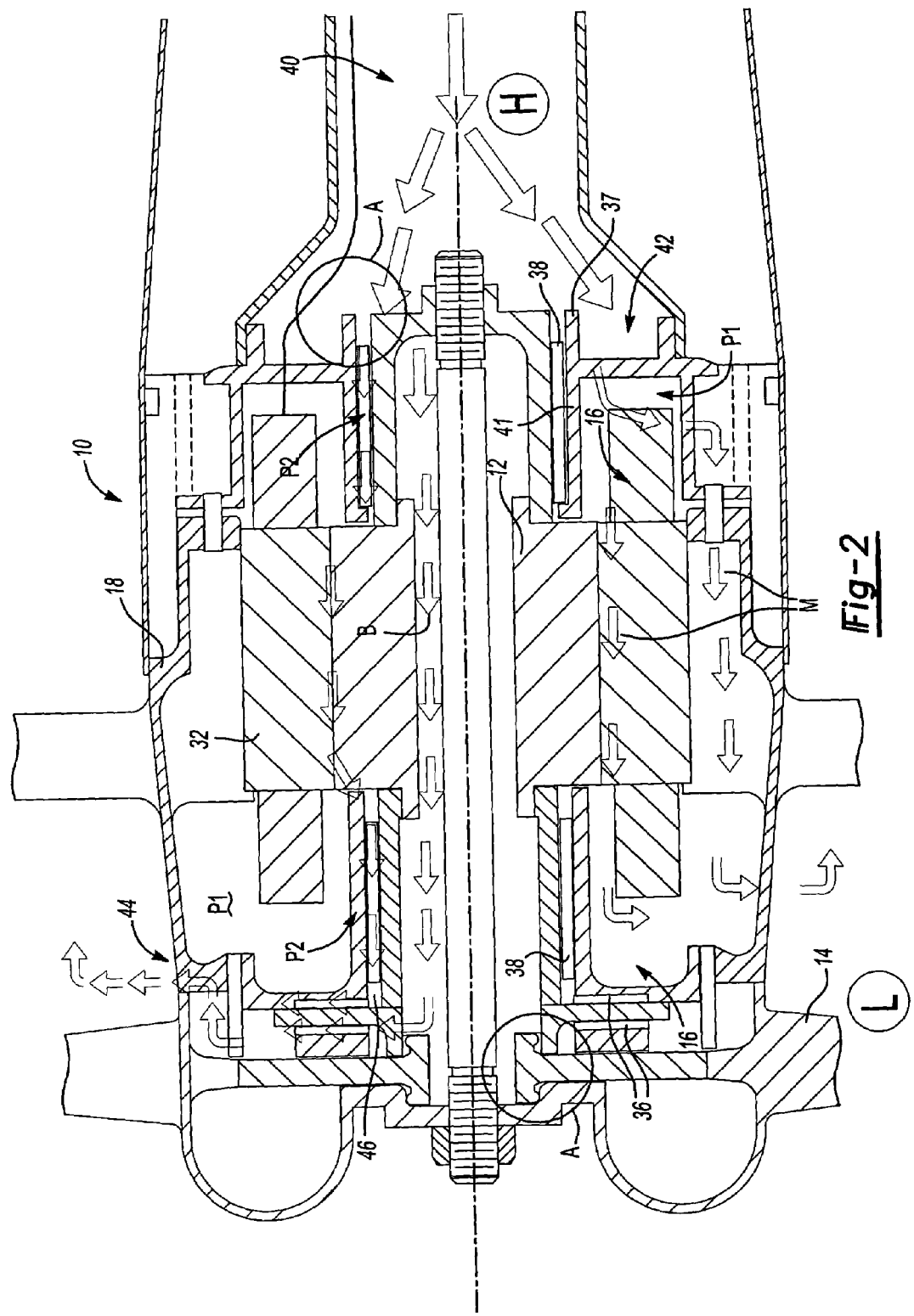
FIG. 2 is an enlarged cross-sectional view of the motor shown in FIG. 1 depicting cooling flow through air bearings and the motor.

An air unit 10 is shown in FIGS. 1 and 2. The unit 10 includes a fan rotor 12 supporting rotor blades 14. An electric motor 16 rotatably drives the fan rotor 12.

The motor 16 is arranged in a motor housing 18, and an inlet housing 20 is secured to the motor housing 18. The inlet housing 20 provides an inlet 22 for supplying air to the rotor blades 14. In the example shown, the inlet 22 receives air from a ram air duct 23. The rotor blades 14 pull atmospheric air through a heat exchanger 24 (shown schematically) and discharge the air overboard.

The motor 16 includes a stator 32 arranged within the motor housing 18 that produces a magnetic field, which generates heat, causing the fan rotor 12 to rotate. The fan rotor 12 is supported by a thrust bearing 36 and journal bearings 38 arranged on either end of the fan rotor 12, in the example shown. A support 37 is secured to the motor housing 18 to support one of the journal bearings 38.

A passage 40 is in fluid communication with the heat exchanger inlet 22 and provides cooling fluid to a cooling inlet 42 that is in fluid communication with the interior of the motor housing 18. A vent 44 is provided in the motor housing 18 that is in fluid communication with the heat exchanger outlet. The heat exchanger inlet 22 is on a high pressure side H, and the vent 44 is on a low pressure side L. The vent 44 is fluidly connected to an outlet 50 arranged in the ram air duct 23. The pressure differential between the high and low pressure sides H and L move cooling fluid through the motor cooling inlet 42 to cool the stator 32, as indicated by the flow path M.

A reverse J-tube 48 is provided on the high pressure side H of the ram air duct 23. The reverse J-tube 48 filters the air from the ram air duct 23, as is known in the art. A passage 49 fluidly connects the reverse J-tube 48 to the cooling inlet 42. Clean cooling fluid flows from the reverse J-tube 48 on the high pressure side H into the bearings and motor and out the vent 44 on the low pressure side L. As a result, pressurized air from a source, such as engine bleed air, is not needed to provide cooling flow. The cooling fluid flows through the motor housing 18 to cool the bearings 36 and 38 and motor as indicated by the flow path B.

Seals 41 are arranged between the compressor rotor 12 and the motor housing 18. Seals normally in the area A may be eliminated since the flow paths M and B converge to a common vent 44. In the example shown the pressure P1 is greater than the pressure P2. As can be appreciated from the Figures, the fan rotor 12 and its bearings 36 and 38 and seals 41 can be generally symmetrical since the loads generated by the pressures P1 and P2 cancel one another. As a result, substantially the same size bearings 36 and 38 and seals 41 may be used.

The outlet 50 is downstream of the fan rotor 56 driven by an electric motor 54 arranged within the ram air duct 23. The fan inlet 22 may be arranged upstream from a heat exchanger 52 within the ram air duct 23 and before the fan 56. The heat exchanger 52, electric motor 54 and fan 56 may be part of an air conditioning pack.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A motor comprising:
   a housing including a single integral motor and bearing cooling inlet;
   a motor arranged within the housing and including a stator and a rotor assembly supported on air bearings, the cooling inlet in fluid communication with a motor cooling path near the stator and a bearing cooling path near the air bearings, the cooling inlet providing a cooling fluid at generally the same pressure on each side of the rotor assembly, the pressures exerted on the rotor assembly producing bearing loads that generally cancel one another; wherein the cooling inlet is in fluid communication with ram heat exchanger inlet in an open loop with one another.

2. The motor according to claim 1, wherein the fan inlet receives air from a ram air duct downstream of the heat exchanger.

3. The motor according to claim 2, wherein the fan inlet is arranged downstream of a heat exchanger in the ram air duct.

4. The motor according to claim 2, wherein the fan inlet is arranged upstream of a ram exit duct.

5. A motor comprising:
   a housing including a single integral motor and bearing cooling inlet;
   a motor arranged within the housing and including a stator and a rotor assembly supported on air bearings, the cooling inlet in fluid communication with a motor cooling path near the stator and a bearing cooling path near the air bearings, the cooling inlet providing a cooling fluid at generally the same pressure on each side of the rotor assembly, the pressures exerted on the rotor assembly producing bearing loads that generally cancel one another, wherein the housing includes motor and fan inlet housing portions secured to one another respectively providing the cooling inlet and a fan inlet, the cooling inlet and fan inlet providing parallel flow paths to one another, the fan inlet flow path arranged radially outward of the cooling inlet flow path with respect to a rotational axis of the motor, the motor arranged in the motor housing portion, the motor driving a fan rotor with the rotor receiving inlet air upstream from a heat exchanger.

6. The motor according to claim 5, wherein a vent is provided in the housing and is common to the motor and bearing cooling paths, the cooling paths converging to the vent.

7. The motor according to claim 6, wherein the vent is in fluid communication with a low pressure side of a ram air duct, and the cooling inlet is in fluid communication with a high pressure side of a ram air duct, a differential pressure between the high and low pressure sides moving cooling fluid from cooling inlet to the vent.

8. The motor according to claim 7, wherein a reverse J-tube in fluid communication with the cooling inlet is arranged in the high pressure side of the ram air duct.

9. The motor according to claim 5, wherein the air bearings include a thrust bearing and at least two journal bearings, the bearing loads generating a generally zero thrust load on the thrust bearing.

10. The motor according to claim 9, wherein the at least two journal bearings are substantially the same size.

11. The motor according to claim 5, wherein the cooling inlet is common to the motor and bearing cooling paths, the cooling paths diverging from the cooling inlet.

12. The motor according to claim 5, the motor cooling path flows through the stator.

13. The motor according to claim 5, the bearing cooling path flows through the air bearings.

14. The motor according to claim 5, wherein the motor and bearing cooling paths receive the cooling fluid from the cooling inlet, the motor inlet at least partially surrounding the cooling inlet.

15. A motor comprising:
   a housing including a single integral motor and bearing cooling inlet;
   a motor arranged within the housing and including a stator and a rotor assembly supported on air bearings, the cooling inlet in fluid communication with a motor cooling path near the stator and a bearing cooling path near the air bearings, the cooling inlet providing a cooling fluid at generally the same pressure on each side of the rotor assembly, the pressures exerted on the rotor assembly producing bearing loads that generally cancel one another, wherein a vent is provided in the housing and is common to the motor and bearing cooling paths, the cooling paths converging to the vent, wherein the vent is in fluid communication with a low pressure side of a ram air duct, and the cooling inlet is in fluid communication with a high pressure side of a ram air duct, a differential pressure between the high and low pressure sides moving cooling fluid from cooling inlet to the vent, wherein the air bearings include upstream and downstream bearings, the upstream bearing in closer proximity to the cooling inlet than the downstream bearing, the upstream bearing having no seals.

* * * * *